United States Patent
Bikos et al.

(10) Patent No.: US 6,789,999 B2
(45) Date of Patent: Sep. 14, 2004

(54) CENTER CONSOLE DUAL CENTRIFUGAL FAN BLOWER

(75) Inventors: Norbert Anthony Bikos, Oakland Township, MI (US); Stefan Helmut Schwarz, Lake Orion, MI (US); German Ludwig Bosherz, Troy, MI (US)

(73) Assignee: Valeo Climate Control Corp, Auburn Hills ( * ) Notice: Subject to any disclaimer, the term of this patent is extended or adjusted under 35 U.S.C. 154(b) by 16 days.

(21) Appl. No.: 10/166,063

(22) Filed: Jun. 11, 2002

(65) Prior Publication Data

US 2003/0228213 A1 Dec. 11, 2003

(51) Int. Cl.[7] ................................................. F01D 3/02
(52) U.S. Cl. ......................................... 415/98; 415/206
(58) Field of Search .............................. 415/203, 206, 415/213.1, 98, 99, 184, 204; 165/42

(56) References Cited

U.S. PATENT DOCUMENTS 2,710,573 A    6/1955  Marker ....................... 454/354
3,805,542 A  * 4/1974  Hosoda et al. ................. 62/262
4,364,513 A  * 12/1982 Tsuzuki et al. ............ 236/49.3
4,902,203 A  * 2/1990  Sager .......................... 417/350
6,367,270 B2 * 4/2002  Niimi et al. .................. 62/133

FOREIGN PATENT DOCUMENTS

GB      2134646 A   *  8/1994   ............. E21F/1/00
JP   2001178098 A   *  6/2001   .......... H02K/21/22

* cited by examiner

Primary Examiner—Edward K. Look
Assistant Examiner—Dwayne White
(74) Attorney, Agent, or Firm—Ronald Courtney

(57) ABSTRACT

An assist airblower unit for a heating and ventilating system of a motor vehicle. The airblower includes a single motor and two centrifugal fan wheels encased within a shell. The motor drives both centrifugal fan wheels via a shaft. The centrifugal fan wheels have angled blades that draws in air from a lateral air inlet located on the shell. The air is then forced out of the outlet openings into the automobiles interior to either heat or cool the vehicle. The air source either outputs at the front of the HVAC unit or recirculation air, i.e., cabin air.

12 Claims, 6 Drawing Sheets

CENTER CONSOLE DUAL CENTRIFUGAL FAN BLOWER

BACKGROUND OF THE INVENTION

1. Field of the Invention

This invention relates generally to a center console airblower for an automobile, and more particularly to having dual wheels to assist air movement from the front passenger compartment to the rear passenger compartment in a vehicle. More specifically, two centrifugal fan wheels are attached to a single motor within a similar housing, air enters from an inlet duct, passes over the wheels and is moved into the outlets, which direct the air to the outlet ducts.

2. Description of Related Art

There exists an enormous waste of economy and energy when viewing the state of the current art concerning blower units for an automobile. The package form of centrifugal fan units currently on the market and that of the prior art is large when compared to the relative installation space in which the devices are required to be installed.

In addition, the airflow in the prior art suffers from several drawbacks. Airflow is hampered and often slow between regions. High pressure drops are associated with the output air in the various regions of the automobile, often the front region of the automobile experiences a relatively high pressure output verses that of the back region. The overall efficiency of the present airblower units is comparatively low. All these drawbacks lead to poor air distribution within an automobile.

In order to effectively provide air to the various compartments of an automobile, blower motors are required to operate at high revolutions per minute (RPMs). This increase in RPMs causes an increase in noise level. Thus, manufacturers have been unable to overcome the aforementioned shortcomings without sacrificing an increase in noise level and loss in overall efficiency.

It is highly desirable to provide a blower design that decreases the noise generated during use, increases the overall efficiency, eliminates both pressure drops and poor air distribution. Ideally, the new design would utilize the current motor employed while still achieving the desired results.

SUMMARY OF THE INVENTION

The present invention is directed to a dual wheel blower system for an automobile. The system includes a pair of centrifugal fan wheels driven by a single motor. Air is drawn from an inlet duct, passes over the motor and through the centrifugal fan wheels, which directs the air toward the outlet ducts. The overall package size is minimized by having two outlets fed by separate outlet ducts to eliminate the need for a large outlet.

It is a further advantage to provide an airblower unit for a heating and ventilating system of a motor vehicle, comprising a motor having an axle extending from the motor, a pair of centrifugal fan wheels, driven by the axle and a casing for housing the motor and the centrifugal fan wheels. The casing comprises at least two casing halves substantially symmetrical with respect to one another. Preferably, the casing halves have an inlet half opening disposed along a back surface of the casing halves, such that an outlet opening is disposed along a front surface thereof.

Another advantage of the present invention is providing casing halves that have an inlet opening disposed along a side surface of the casing halves and an outlet opening disposed along a front surface of the casing halves.

It is yet another advantage of the present invention to provide the casing halves where the inlet ducts are located on both a backside and the side surfaces.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings.

DETAILED DESCRIPTION OF THE PRESENT INVENTION

A center console blower unit (not shown) includes an air blower 10, which is mounted inside the casing of the blower unit. The air blower 10 is comprised of a motor 12 that drives a pair of centrifugal fan wheels 14, 16. The airblower unit 10 assists the flow of air for ventilating systems. Air is provided from either output at the main HVAC unit or from recirculation air from the cabin.

Figure 1:
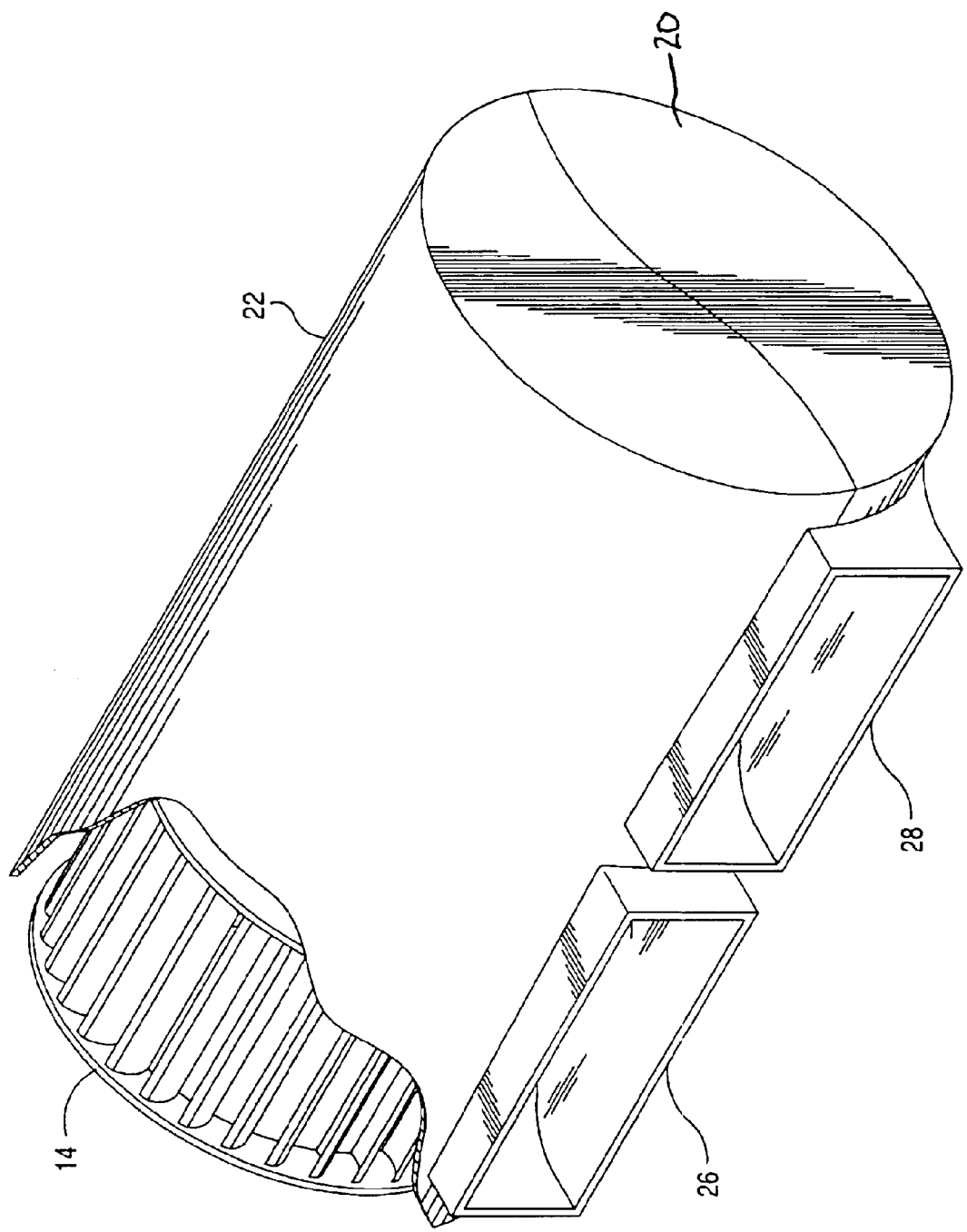
FIG. 1 is a perspective view of the invention.
Figure 2:
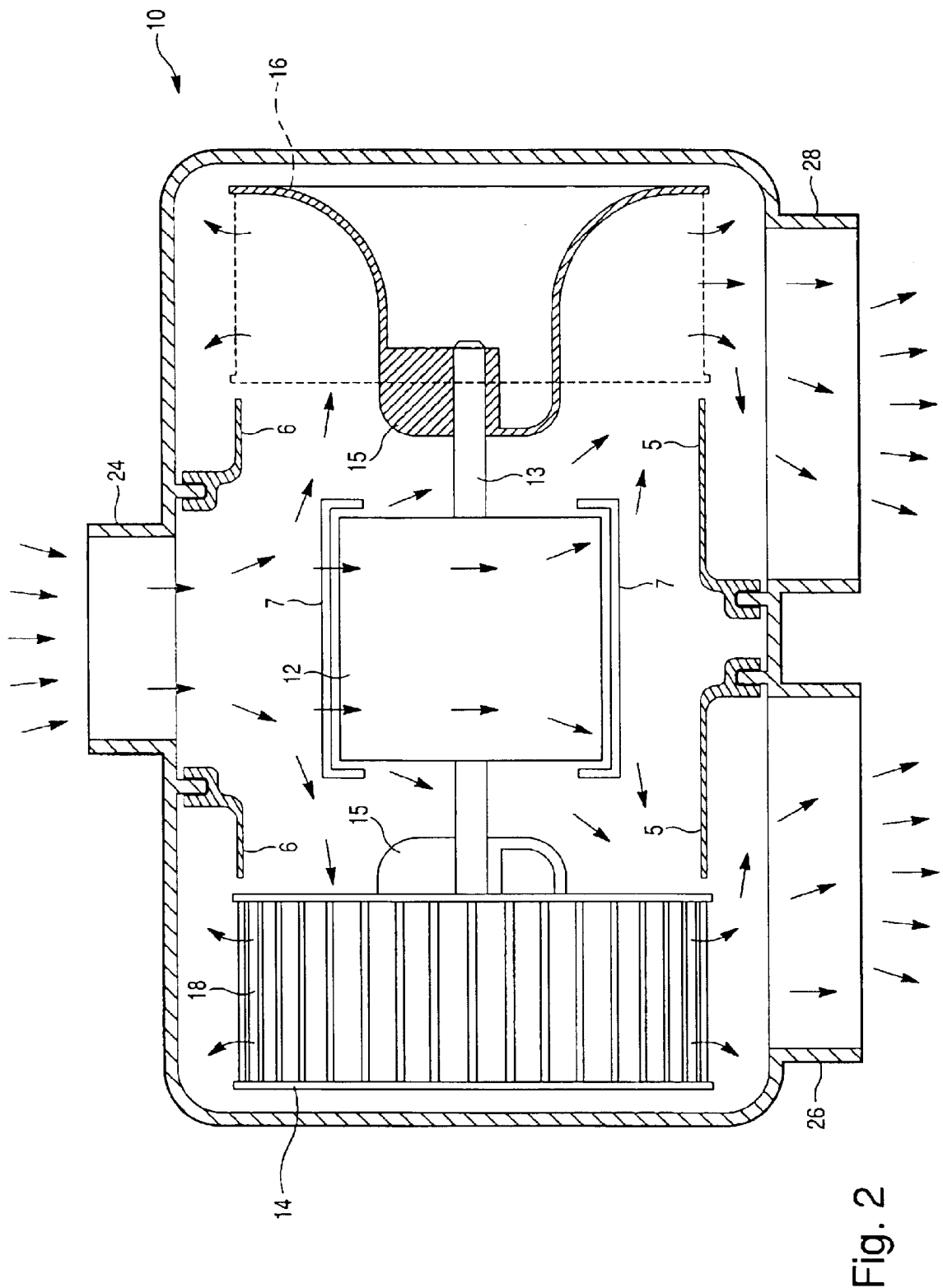
FIG. 2 is a plan view of the invention.

The centrifugal fan wheels 14, 15 and the motor 12 are housed within two half shells 20, 22 as shown in FIGS. 1 and 2. The half shells are preferably formed from molding a plastic into the desired shape. Alternatively, the half shells may be constructed from sheet metal or the like, wherein the various walls of each half shell are permanently fixed or joined together. The half shells 20, 22 form mate along a physical part split line as seen in FIG. 1. Half shell 20 forms the lower portion of the housing while half shell 22 forms the upper half of the housing. When mated together, the half shells 20, 22 define a blower chamber.

Each of the half shells 20, 22 define an outlet opening 26, 28 as well as a lateral half air inlet 24. When the two half shells 20, 22 are joined together, the two lateral half air inlets for a single lateral air inlet 24 on the back panel of the airblower 10, see FIG. 2. The lateral air inlet 24 is generally rectangular in shape such that it abuts snugly against a mounting frame (not shown). For this purpose, the mounting frame is of substantially the same profile as both of the two half openings of the lateral air inlet 24 when the latter are joined together, so that it is able to be adapted to these half openings on either one of its two mounting sides. Thus, the lateral air inlet is not confined to a rectangular shape, any shape may be used as long as the mounting frame can engage the air inlet and create a seal.

Mounted within the half shells 20, 22 are a motor 12 and two centrifugal fan wheels 14, 16. The motor 12 is centrally located within the blower chamber and is fixed to the bottom surface of the two shells 20, 22 between middle guide walls 7. The middle guide walls 7 are shaped to correspond directly with outer circumference of the motor 12 base preventing the motor from excessively movement during automobile operation. The motor may be fixed by any means known to those skilled in the art. Similarly, the motor 12 may be any motor presently used within the industry or one known to those skilled in the art compatible with airblower units. The motor has a single shaft 13 that extends in the axial direction toward each of the centrifugal fan wheels 14, 16. Alternatively, two shafts may also be used as long as the shafts extend substantially in the same axial direction as that of the single shaft.

Figure 3:
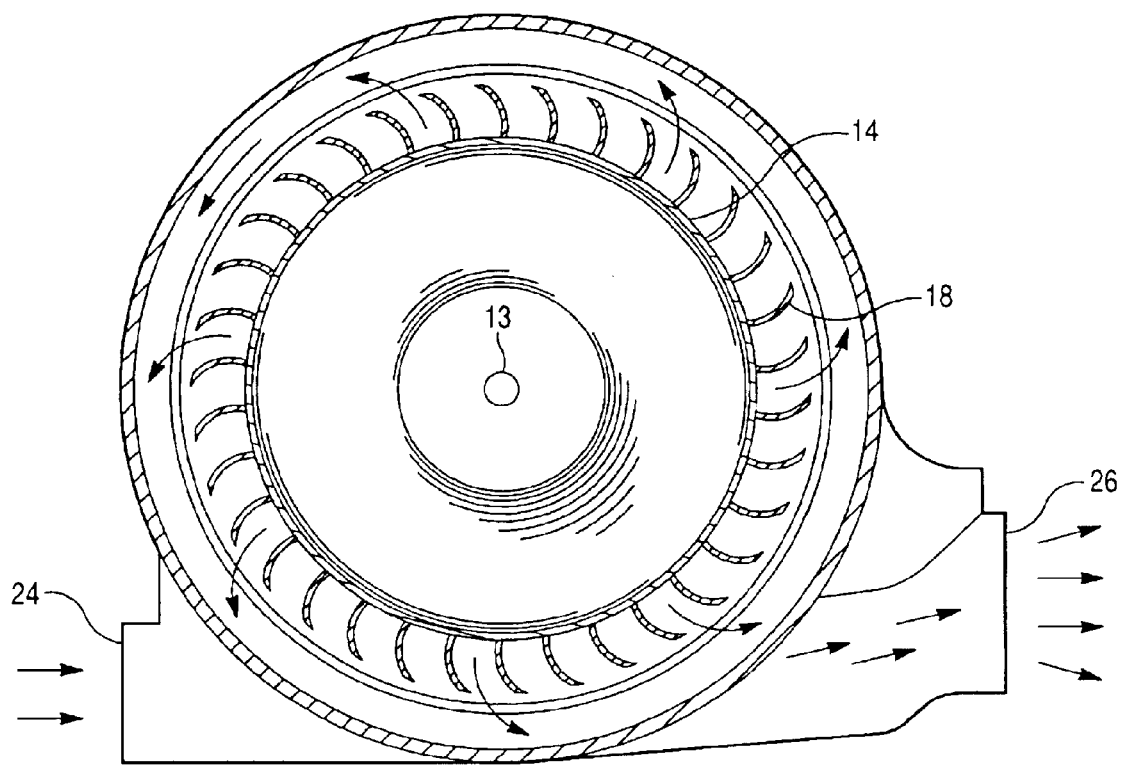
FIG. 3 is a side view of a cross section of the invention.

Affixed to the shaft 13 at each of the distal ends is a mounting bracket 15. The mounting brackets 15 are utilized to secure the centrifugal fan wheels 14, 16 to the shaft as shown in FIGS. 2 and 3. The mounting brackets 15 have a small inner radius that is coupled to the motor shaft 13. The mounting brackets 15 have extensions radiating outward in both the radial and circumferential directions. The centrifugal fan wheels 14 and 16 are affixed to the extremity of the mounting brackets 15 opposite the shaft 13. The mounting brackets 15 are solid so as to properly direct the airflow, described herein.

As best shown in FIG. 2, the mounting brackets 15 are affixed to the centrifugal fan wheels 14, 15 along an outer edge, also the edge closest the casing side walls. The inner edge of the centrifugal fan wheels 14, 16 is positioned adjacent to the interior walls 5, 6. The mounting brackets 15 properly position the centrifugal fan wheels 14, 16 within the blower chamber defined by the shells 20, 22 so that the centrifugal fan wheels 14, 16 spin unimpeded within the blower chamber. However, it should be appreciated that the mounting bracket may also be integrally formed with the centrifugal fan.

Front and rear interior walls 5, 6 are positioned within the shells 20, 22 so that when the centrifugal fan wheels 14, 16 are in place, the airblower chamber is divided into an inner cavity and an outer cavity.

The centrifugal fan wheels 14, 16 are generally circular in shape. Referring to FIGS. 2 and 3, the centrifugal fan wheels 14, 16 have blades 18 or mirror blades on the outer circumference of the centrifugal fan wheels 14, 16. The blades 18 are oriented in the axial direction and angled with respect to the radial direction.

The following explanation traces the path of the airflow from the lateral inlet duct 24 through the interior of the airblower 10 and out from the outlet ducts 26, 28. The airflow is indicated by arrows as shown in FIGS. 2 and 3. When the centrifugal fan wheels 14, 16 are driven by the motor 12, air is drawn through the lateral air inlet duct 24, forcing air into the center of the centrifugal fan wheels 14, 16 via the inner cavity. Airflow loss through the gap located between the centrifugal fan wheels 14, 16 and the interior walls 5, 6 is negligible.

As seen in FIG. 3, the blades 18 are also spaced in the circumferential direction in order to allow air to pass through as the centrifugal fan wheels 14, 16 as they rotate. Thus, the air passes from the inner cavity to the outer cavity where the air is forced toward the outlet ducts 26, 28 by the rotation of the centrifugal fan wheels 16, 18 as best seen in FIG. 2. Here again, the front and rear inner walls 5, 6 prevent the air from escaping the intended flow pattern.

The particular shape of the blades within the centrifugal fan wheels 16, 18 may vary and are best determined by those skilled in the art depending upon the specific performance requirements requested by the project.

Figure 4:
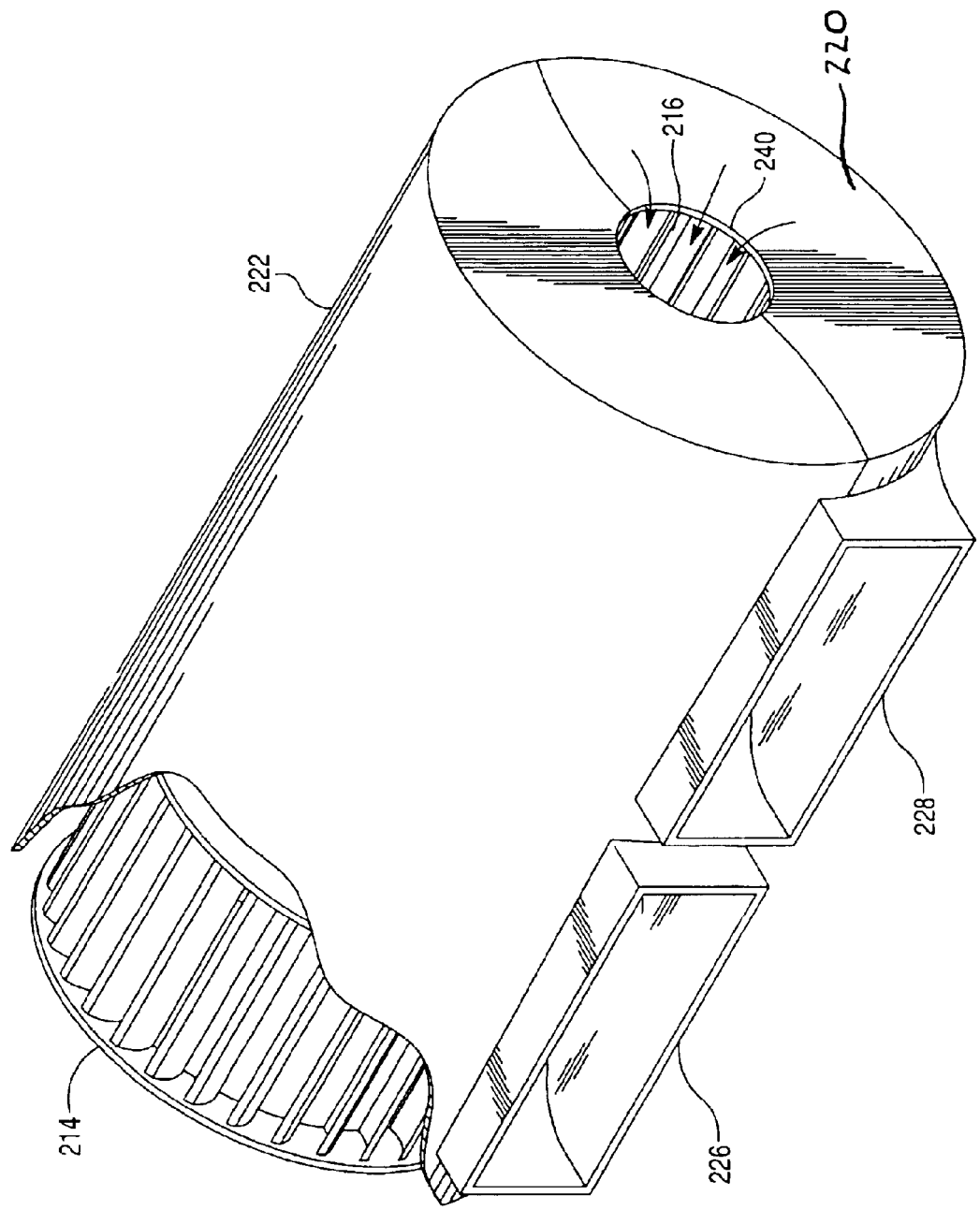
FIG. 4 is a perspective view of another embodiment of the invention.
Figure 5:
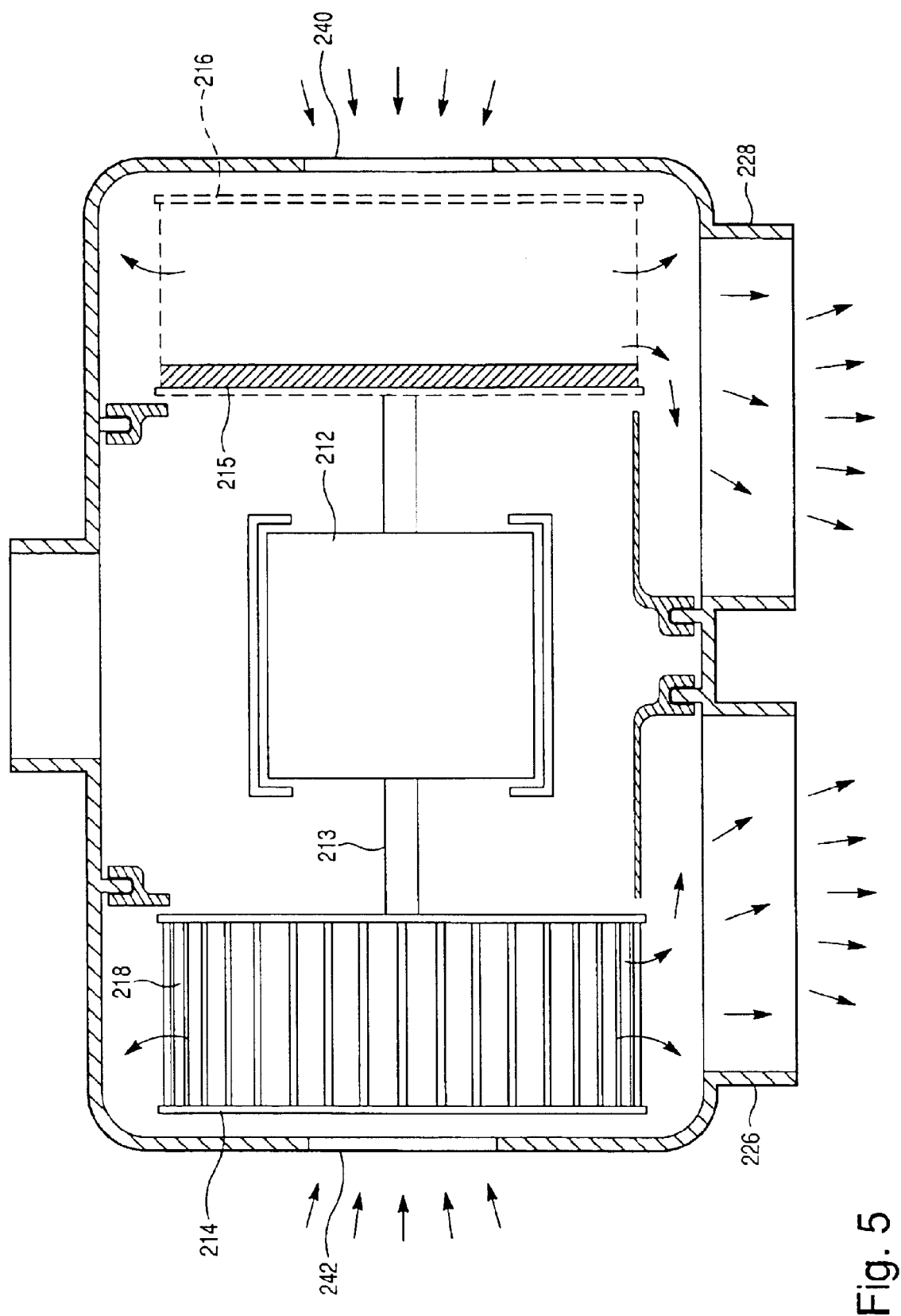
FIG. 5 is a plan view of another embodiment of the invention.

In an alternative embodiment as shown in FIGS. 4 and 5, the air is drawn in from inlet passages 240, 242 located on the sides of the shells 220, 222. The inlet passages 240, 242 are disposed about the geometric center of the side panels of the shells 220, 222. The particular diameter of the inlet passages 240, 242 may vary depending upon the design requirements for the airflow and space provided. In addition, the shape of the inlet passages 240, 242 are not confined to that of a circle, any shape may be used so long as air is permitted to flow therethrough. In this particular embodiment, the air immediately enters into the open space within the centrifugal fan wheels 214, 216. In order to properly direct the air flow, the mounting brackets 215 is secured to the inside edge of the centrifugal fan wheels 214, 216 as indicated in FIG. 5. The rotation of the centrifugal fan wheels 214, 216 in combination with the angled blades force the air from an inner space within the centrifugal fan wheels 214, 218 outward through the blades toward the outlet outlets 226, 228.

Figure 6:
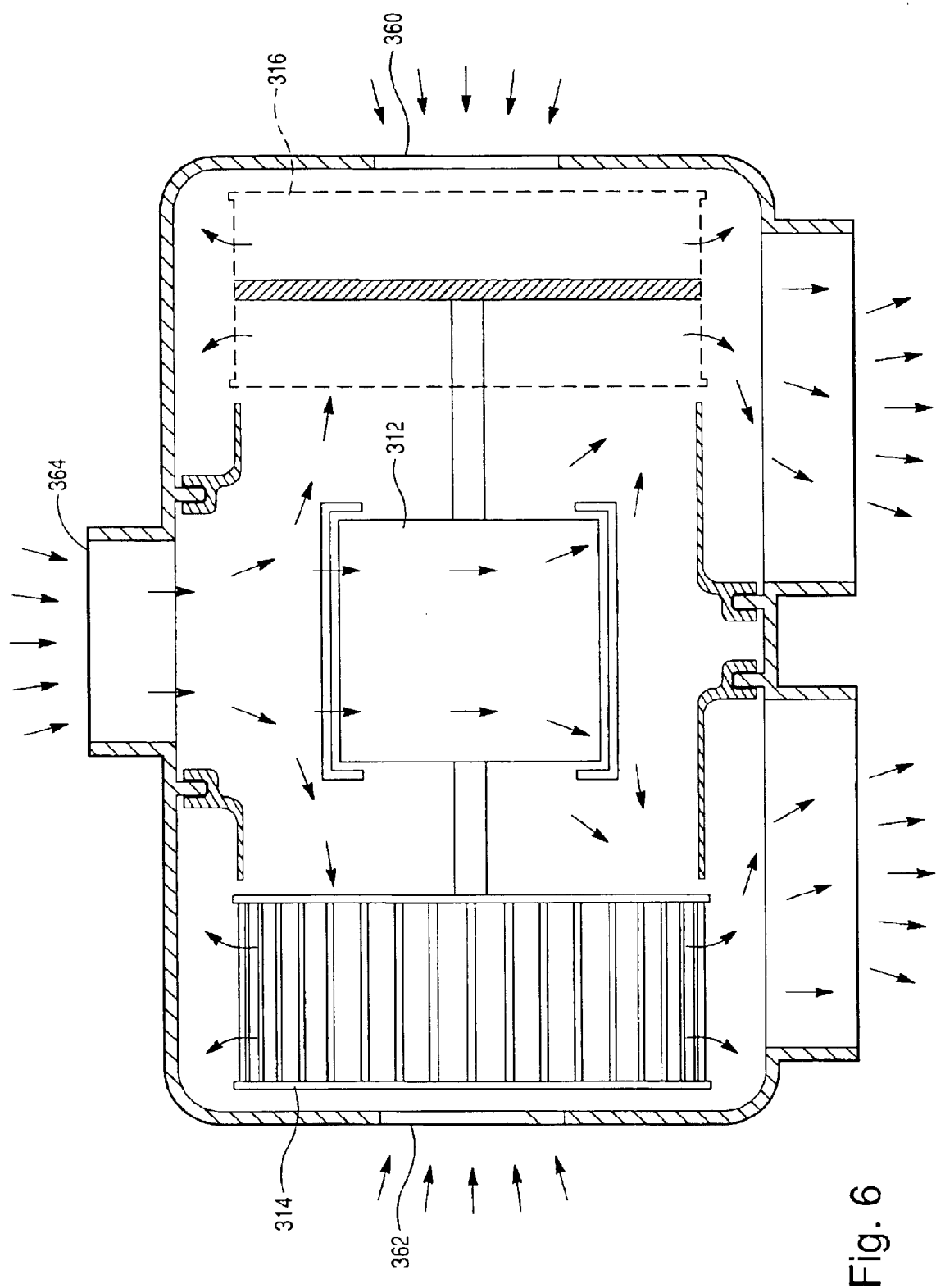
FIG. 6 is a plan view of yet another embodiment of the invention.

In yet another embodiment shown in FIG. 6, the air is drawn in from both a lateral air inlet 364 located on the back panel of the shells and inlet passages 360, 362 located on the sides of the shells. In this embodiment, the volume of air drawn into the system by operation of the motor 312 and the centrifugal fan wheels 314, 316 as described in both embodiments mentioned immediately above, also shown in FIGS. 2 and 5. In this embodiment, the mounting brackets 315 are secured to centrifugal fan wheels 314, 316 along the centerline in the radial direction. When the mounting brackets 315 are in position, the air may flow from both inlets on the sides of the shell 360, 362 and from the lateral air inlet 364 through the centrifugal fan wheels 314, 316. Thus, the volume of air intake increases while maintaining the low revolutions per minute.

Referring back to FIG. 3, the air is forced by the angular blades 18 on the wheels 14, 16 toward the outlets 26, 28. The air that exits from the outlets 26, 28 after having been forced through the air blower 10 is then transported through the duct system to the different regions in the automobile.

Use of duel centrifugal fan wheels 14, 16 increases the resultant work product of the motor 12. More specifically, the volume of air forced through the outlet ducts is increased significantly. The motor 12 produces the same revolutions per minute as that of the prior art, but the addition of the second centrifugal fan wheel to the airblower unit 10 allows for the volume of air moved to double. Similarly, the motor 12 uses the same current and electricity as that of the prior art. The motor 12 used with the airblower unit is either a variable speed motor, a fixed speed motor, or a pulsed motor. The pulsed motor generates a plurality of pulsed signals representative of the rotational position of the motor rotor. Additionally, the motor may either be a direct current brush type or brush-less type of motor. No additional requirements are necessary for implementation of the airblower unit 10 as described above within an automobile heating and air-conditioning system.

While the foregoing invention has been shown and described with reference to several preferred embodiments, it will be understood that various changes in form and detail may be made without departing from the spirit and scope of the present invention. For example, two centrifugal fan wheels may both be co-located on one particular side of the motor depending upon the needs of the particular heating and air-conditioning system used.

What is claimed is:

1. An air blower unit for a heating and ventilating system of a motor vehicle, comprising:
   a housing;
   a pair of centrifugal fan wheels disposed within said housing provided to force air through said housing; and a motor disposed within said housing and drivenly connected to each of said centrifugal fan wheels, wherein said single motor generates a plurality of pulsed signals representative of the rotational position of a motor rotor.

2. The air blower unit according to claim 1, wherein said housing comprises at least two housing valves secured to one another to define a blower chamber.

3. The air blower unit according to claim 1, wherein said pair of centrifugal fan wheels are coaxially mounted to said motor and driven about an axis of rotation.

4. The air blower according to claim 3, further comprising front and rear interior walls to form an inner and outer cavity.

5. The air blower unit according to claim 3, wherein said housing has at least one of an inlet opening disposed along a front surface parallel to said axis of rotation.

6. The air blower unit according to claim 5, wherein said housing has an outlet opening disposed along a back surface parallel to said axis of rotation, opposite said front surface.

7. The air blower unit according to claim 3, wherein said pair of centrifugal fan wheels comprise a plurality of blades extending in a circumferential direction along an outer perimeter of said centrifugal fan wheels.

8. The air blower unit according to claim 7, wherein said plurality of blades are angled with respect to said circumferential direction of said centrifugal fan wheels.

9. The air blower unit according to claim 1, wherein said single motor is a variable speed motor.

10. The air blower unit according to claim 1, wherein said single motor is a fixed speed motor.

11. The air blower unit according to claim 1, wherein said single motor is one of a direct current brush type motor and a direct current brush-less type motor.

12. The air blower unit according to claim 1, wherein said housing is interchangeably fit into one of an air-conditioning and heating system of an automobile.

* * * * *